(12) United States Patent
Wong

(10) Patent No.: US 8,758,626 B2
(45) Date of Patent: Jun. 24, 2014

(54) WATER PURIFICATION CARTRIDGE USING ZIRCONIUM ION-EXCHANGE SORBENTS

(75) Inventor: Raymond Wong, Norman, OK (US)

(73) Assignee: Fresenius Medical Care Holdings, Inc., Waltham, MA (US)

( * ) Notice: Subject to any disclaimer, the term of this patent is extended or adjusted under 35 U.S.C. 154(b) by 111 days.

(21) Appl. No.: 13/509,070

(22) PCT Filed: Oct. 26, 2010

(86) PCT No.: PCT/US2010/054068
§ 371 (c)(1),
(2), (4) Date: May 10, 2012

(87) PCT Pub. No.: WO2011/071605
PCT Pub. Date: Jun. 16, 2011

(65) Prior Publication Data
US 2012/0234762 A1    Sep. 20, 2012

Related U.S. Application Data

(60) Provisional application No. 61/267,125, filed on Dec. 7, 2009.

(51) Int. Cl.
| | |
|---|---|
| *B01D 15/36* | (2006.01) |
| *B01D 61/26* | (2006.01) |
| *B01D 61/28* | (2006.01) |
| *B01D 24/00* | (2006.01) |
| *C02F 1/42* | (2006.01) |
| *C02F 101/10* | (2006.01) |
| *B01J 20/04* | (2006.01) |
| *C02F 1/28* | (2006.01) |
| *B01J 39/12* | (2006.01) |
| *B01J 47/00* | (2006.01) |
| *B01J 47/02* | (2006.01) |
| *C02F 103/02* | (2006.01) |

(52) U.S. Cl.
CPC ............... *C02F 1/281* (2013.01); *C02F 1/283* (2013.01); *C02F 1/288* (2013.01); *B01J 39/12* (2013.01); *B01J 47/002* (2013.01); *B01J 47/022* (2013.01); *C02F 2201/006* (2013.01); *C02F 2103/026* (2013.01)
USPC ............ 210/660; 210/483; 210/488; 210/489; 210/490; 210/501; 210/502.1; 210/503; 210/644; 210/647; 210/679; 210/681; 502/400; 502/416

(58) Field of Classification Search
CPC .......... B01J 39/12; B01J 39/24; B01J 47/002; B01J 47/02; B01J 47/022; C02F 1/281; C02F 1/283; C02F 1/288; C02F 1/42; C02F 2103/026; C02F 2201/006
USPC .............. 210/198.2, 266, 295, 483, 488, 489, 210/490, 501, 502.1, 503, 644, 645, 647, 210/660, 679, 681, 683, 685–687, 767, 283, 210/287, 661; 502/400, 416
See application file for complete search history.

(56) References Cited

U.S. PATENT DOCUMENTS

| | | |
|---|---|---|
| 3,645,922 A | 2/1972 | Weiss et al. |
| 3,669,878 A | 6/1972 | Marantz et al. |

(Continued)

FOREIGN PATENT DOCUMENTS

| | | |
|---|---|---|
| EP | 0684210 A1 | 11/1995 |
| JP | 52-134877 | 11/1997 |

(Continued)

OTHER PUBLICATIONS

International Search Report and Written Opinion of the International Searching Authority issued in corresponding International Patent Application No. PCT/US2010/054068 dated Jan. 18, 2011 (7 pages).

(Continued)

*Primary Examiner* — John Kim
(74) *Attorney, Agent, or Firm* — Kilyk & Bowersox, P.L.L.C.

(57) ABSTRACT

A cartridge having at least one layer containing sodium zirconium phosphate and at least one layer containing a combination of acid zirconium phosphate and alkaline hydrous zirconium oxide is described. Methods of using the cartridge for water purification are also described.

36 Claims, 17 Drawing Sheets

(56) References Cited

U.S. PATENT DOCUMENTS

| | | |
|---|---|---|
| 3,669,880 A | 6/1972 | Marantz et al. |
| 3,989,622 A | 11/1976 | Marantz et al. |
| 4,250,141 A | 2/1981 | Lehmann et al. |
| 4,405,574 A | 9/1983 | Lee et al. |
| 4,434,138 A | 2/1984 | Lee et al. |
| 4,581,141 A | 4/1986 | Ash |
| 4,687,582 A | 8/1987 | Dixon |
| 4,724,082 A | 2/1988 | Boom |
| 5,346,624 A | 9/1994 | Libutti et al. |
| 5,626,763 A | 5/1997 | Mathews |
| 5,811,012 A | 9/1998 | Tanabe et al. |
| 5,837,826 A | 11/1998 | Flickinger et al. |
| 5,948,265 A | 9/1999 | Wakamatsu et al. |
| 6,814,871 B1 | 11/2004 | Bem et al. |
| 6,878,283 B2 | 4/2005 | Thompson |
| 7,033,498 B2 | 4/2006 | Wong |
| 7,252,767 B2 | 8/2007 | Bortun et al. |
| 7,481,929 B2 | 1/2009 | Wilkins et al. |
| 7,566,432 B2 | 7/2009 | Wong |
| 2002/0112609 A1 | 8/2002 | Wong |
| 2002/0190002 A1 | 12/2002 | Urquhart et al. |
| 2003/0196959 A1 | 10/2003 | Hughes |
| 2004/0007531 A1 | 1/2004 | Bortun et al. |
| 2004/0020857 A1 | 2/2004 | Belew et al. |
| 2004/0050784 A1 | 3/2004 | Belew et al. |
| 2005/0031523 A1 | 2/2005 | Wong |
| 2005/0274658 A1 | 12/2005 | Rosenbaum et al. |
| 2006/0140840 A1 | 6/2006 | Wong |
| 2008/0105620 A1 | 5/2008 | Hicks |
| 2010/0078387 A1 | 4/2010 | Wong |

FOREIGN PATENT DOCUMENTS

| | | |
|---|---|---|
| WO | 95-16638 A1 | 6/1995 |
| WO | 99-20393 A1 | 4/1999 |
| WO | 2008-025358 A1 | 3/2008 |

OTHER PUBLICATIONS

Roberts, "The regenerative dialysis (REDY) sorbent system," Nephrology, vol. 4, 1998, pp. 275-278.

PURITY LEVEL OF EFFLUENT FROM SORBENT CARTRIDGE IN THE TREATMENT OF OKLAHOMA CITY WATER WITH ADDED CONTAMINANTS

DL = Detection Limit

| METALS | Cu | Zr | Pb | Zn | Al | Ag | As |
|---|---|---|---|---|---|---|---|
| ANALYTICAL TECHNIQUE | DCP | DCP | DCP | DCP | DCP | DCP | DCP |
| DL | 5 PPb | 10 PPb | 5 PPb | 5 PPb | 2 PPb | 5 PPb | 5 PPb |
| FEED WATER | 80 PPb | <DL | 1080 PPb | 50 PPb | 40 PPb | <DL | 100 PPb |
| INITIAL EFFL | <DL | <DL | <DL | <DL | <DL | <DL | <DL |
| 5 GAL | <DL | <DL | <DL | <DL | <DL | <DL | <DL |
| 10 GAL | <DL | <DL | <DL | <DL | <DL | <DL | <DL |
| 20 GAL | <DL | <DL | <DL | <DL | <DL | <DL | <DL |
| 30 GAL | <DL | <DL | <DL | <DL | <DL | <DL | <DL |
| 40 GAL | <DL | <DL | <DL | <DL | <DL | <DL | <DL |
| 50 GAL | <DL | <DL | <DL | <DL | <DL | <DL | <DL |
| 60 GAL | <DL | <DL | <DL | <DL | <DL | <DL | <DL |
| 70 GAL | <DL | <DL | <DL | <DL | <DL | <DL | <DL |
| REMOVAL EFFICIENCY | 100% | -- | 100% | 100% | 100% | -- | 100% |

FIG. 4A

PURITY LEVEL OF EFFLUENT FROM SORBENT CARTRIDGE IN THE TREATMENT OF OKLAHOMA CITY WATER WITH ADDED CONTAMINANTS

DL = Detection Limit

| Cd | Cr | Sc | Hg | Ba | Fe | Sb | Bi |
|---|---|---|---|---|---|---|---|
| AA | DCP | -- | Flameless AA | DCP | DCP | AA | AA |
| 0.5 PPb | .5 PPm | -- | .05 PPm | 5 PPb | .5 PPb | .5 PPm | .5 PPm |
| <DL | 2 PPb | -- | <DL | 2070 PPb | 10 PPb | <DL | <DL |
| <DL | <DL | -- | <DL | <DL | <DL | <DL | <DL |
| <DL | <DL | -- | <DL | <DL | <DL | <DL | <DL |
| <DL | <DL | -- | <DL | <DL | <DL | <DL | <DL |
| <DL | <DL | -- | <DL | <DL | <DL | <DL | <DL |
| <DL | <DL | -- | <DL | <DL | <DL | <DL | <DL |
| <DL | <DL | -- | <DL | <DL | <DL | <DL | <DL |
| <DL | <DL | -- | <DL | <DL | <DL | <DL | <DL |
| <DL | <DL | -- | <DL | <DL | <DL | <DL | <DL |
| <DL | <DL | -- | <DL | <DL | <DL | <DL | <DL |
| <DL | <DL | -- | <DL | <DL | <DL | <DL | <DL |
| -- | 100% | -- | -- | 100% | 100% | -- | -- |

FIG. 4B

PURITY LEVEL OF EFFLUENT FROM SORBENT CARTRIDGE IN THE TREATMENT OF OKLAHOMA CITY WATER WITH ADDED CONTAMINANTS

DL = Detection Limit

| Sr | Be | Ti | Si | Sn |
|---|---|---|---|---|
| DCP | AA | DCP | AA | AA |
| .5 PPb | .03 PPm | 5 PPb | 2 PPm | 3 PPm |
| 30 PPb | <DL | 30 PPb | 3 PPm | <DL |
| <DL | <DL | <DL | <DL | <DL |
| <DL | <DL | <DL | <DL | <DL |
| <DL | <DL | <DL | <DL | <DL |
| <DL | <DL | <DL | <DL | <DL |
| <DL | <DL | <DL | <DL | <DL |
| <DL | <DL | <DL | <DL | <DL |
| <DL | <DL | <DL | <DL | <DL |
| <DL | <DL | <DL | <DL | <DL |
| <DL | <DL | <DL | <DL | <DL |
| 100% | -- | 100% | 100% | -- |

FIG. 4C

PURITY LEVEL OF EFFLUENT FROM SORBENT CARTRIDGE IN THE TREATMENT OF
OKLAHOMA CITY WATER WITH ADDED CONTAMINANTS

DL = Detection Limit

| METALS/NON-METALS | Hf | Ni | Co | Mn | Na | K | Ca |
|---|---|---|---|---|---|---|---|
| ANALYTICAL TECHNIQUE | AA | DCP | -- | DCP | DCP | DCP | DCP |
| DL | 10 PPm | 2 PPb | -- | .5 PPb | .005 PPm | .01 PPm | .01 PPm |
| FEED WATER | <DL | <DL | -- | <DL | 28.7 PPm | 4.5 PPm | 14 PPm |
| INITIAL EFF | <DL | <DL | -- | <DL | .4 PPm | <DL | .055 PPm |
| 5 GAL | <DL | <DL | -- | <DL | .4 PPm | <DL | .05 PPm |
| 10 GAL | <DL | <DL | -- | <DL | .8 PPm | <DL | .06 PPm |
| 20 GAL | <DL | <DL | -- | <DL | 1.0 PPm | <DL | .07 PPm |
| 30 GAL | <DL | <DL | -- | <DL | 1.8 PPm | <DL | .08 PPm |
| 40 GAL | <DL | <DL | -- | <DL | 5 PPm | <DL | .08 PPm |
| 50 GAL | <DL | <DL | -- | <DL | 12 PPm | <DL | .08 PPm |
| 60 GAL | <DL | <DL | -- | <DL | 12 PPm | <DL | .08 PPm |
| 70 GAL | <DL | <DL | -- | <DL | 12 PPm | <DL | .07 PPm |
| REMOVED EFFICIENCY | -- | -- | -- | -- | (1) 93.6% (1) 58% | 100% | (1) 99.6% (1) 99.4% |

FIG. 5A

PURITY LEVEL OF EFFLUENT FROM SORBENT CARTRIDGE IN THE TREATMENT OF
OKLAHOMA CITY WATER WITH ADDED CONTAMINANTS

DL = Detection Limit

| Mg | Cl$^-$ | F$^-$ | SO$_4^{2-}$ | NO$_3^-$ | PO$_4^{3-}$ | Free Chlorine | Chloramine |
|---|---|---|---|---|---|---|---|
| DCP | DCP | Ion Selective Electrode | Reagent | Reagent | Reagent | Reagent | Reagent |
| .005 PPm | 1 PPm | .2 PPm | .1 mg% | .01 PPm | 2 PPm | .1 PPm | .1 PPm |
| 3.7 PPm | 40 PPm | 10.4 PPm | <DL | 5 PPm | <DL | 1.0 PPm | 1.0 PPm |
| .01 PPm | <DL | <DL | <DL | <DL | <DL | <DL | <DL |
| .01 PPm | <DL | <DL | <DL | <DL | <DL | <DL | <DL |
| .01 PPm | <DL | <DL | <DL | <DL | <DL | <DL | <DL |
| .01 PPm | <DL | <DL | <DL | <DL | <DL | <DL | <DL |
| .01 PPm | 2 PPm | <DL | <DL | <DL | <DL | <DL | <DL |
| .01 PPm | 2 PPm | <DL | <DL | <DL | <DL | <DL | <DL |
| .01 PPm | 4 PPm | <DL | <DL | <DL | <DL | <DL | <DL |
| .01 PPm | 8 PPm | <DL | <DL | <DL | <DL | <DL | <DL |
| .01 PPm | 20 PPm | <DL | <DL | <DL | <DL | <DL | <DL |
| 99.7% | (1) 100% (1) 50% | 100% | -- | 100% | -- | 100% | 100% |

FIG. 5B

PURITY LEVEL OF EFFLUENT FROM SORBENT CARTRIDGE IN THE TREATMENT OF OKLAHOMA CITY WATER WITH ADDED CONTAMINANTS

DL = Detection Limit

| pH | Conductivity |
|---|---|
| pH meter | Conduct meter |
| -- | -- |
| 7.4 | 178 μmhos |
| 5.35 | 1.5 μmhos |
| 5.0 | 0.5 μmhos |
| 4.9 | 0.5 μmhos |
| 5.3 | 1.5 μmhos |
| 5.1 | 2.7 μmhos |
| 4.9 | 4 μmhos |
| 4.9 | 9 μmhos |
| 4.7 | 20 μmhos |
| 4.5 | 40 μmhos |
| -- | -- |

FIG. 5C

DL = Detection Limit

| METALS | Cu | Zr | Pb | Ba | Zn | Al | Ag |
|---|---|---|---|---|---|---|---|
| ANALYTICAL TECHNIQUE | DCP | DCP | DCP | DCP | DCP | DCP | DCP |
| DL | 5 PPb | 10 PPb | 5 PPb | 5 PPb | 5 PPb | 2 PPb | 5 PPb |
| FEED WATER | 75 PPb | <DL | 1100 PPb | 2100 PPb | 65 PPb | 38 PPb | <DL |
| EFFLUENT WATER 5 GAL | <DL | <DL | <DL | <DL | <DL | <DL | <DL |
| 10 GAL | <DL | <DL | <DL | <DL | <DL | <DL | <DL |
| 20 GAL | <DL | <DL | <DL | <DL | <DL | <DL | <DL |
| 30 GAL | <DL | <DL | <DL | <DL | <DL | <DL | <DL |
| 40 GAL | <DL | <DL | <DL | <DL | <DL | <DL | <DL |
| 50 GAL | <DL | <DL | <DL | <DL | <DL | <DL | <DL |
| 60 GAL | <DL | <DL | <DL | <DL | <DL | <DL | <DL |
| 70 GAL | <DL | <DL | <DL | <DL | <DL | <DL | <DL |
| REMOVAL EFFICIENCY | 100% | -- | 100% | 100% | 100% | 100% | -- |

FIG. 6A

DL = Detection Limit

| As | Cd | Cr | Se | Hg | Fe | Sb | Bi |
|---|---|---|---|---|---|---|---|
| DCP | AA | DCP | -- | Flameless AA | DCP | AA | AA |
| 5 PPb | 0.05 PPm | .5 PPb | -- | .05 PPm | .5 PPb | .5 PPm | .5 PPm |
| 100 PPb | <DL | 2 PPb | -- | <DL | 12 PPb | <DL | <DL |
| <DL | <DL | <DL | -- | <DL | <DL | <DL | <DL |
| <DL | <DL | <DL | -- | <DL | <DL | <DL | <DL |
| <DL | <DL | <DL | -- | <DL | <DL | <DL | <DL |
| <DL | <DL | <DL | -- | <DL | <DL | <DL | <DL |
| <DL | <DL | <DL | -- | <DL | <DL | <DL | <DL |
| <DL | <DL | <DL | -- | <DL | <DL | <DL | <DL |
| <DL | <DL | <DL | -- | <DL | <DL | <DL | <DL |
| <DL | <DL | <DL | -- | <DL | <DL | <DL | <DL |
| 100% | -- | 100% | -- | -- | 100% | -- | -- |

FIG. 6B

DL = Detection Limit

| Sr | Be | Ti |
|---|---|---|
| DCP | AA | DCP |
| .5 PPb | .03 PPm | 5 PPb |
| 35 PPb | <DL | 30 PPb |
| <DL | <DL | <DL |
| <DL | <DL | <DL |
| <DL | <DL | <DL |
| <DL | <DL | <DL |
| <DL | <DL | <DL |
| <DL | <DL | <DL |
| <DL | <DL | <DL |
| <DL | <DL | <DL |
| 100% | -- | 100% |

FIG. 6C

DL = Detection Limit

| METALS/<br>NON-METALS | Si | Sn | Hf | Ni | Co | Mn | Na |
|---|---|---|---|---|---|---|---|
| ANALYTICAL<br>TECHNIQUE | AA | AA | AA | DCP | -- | DCP | DCP |
| DL | 2<br>PPm | 3<br>PPm | 10<br>PPm | 2<br>PPb | -- | .5<br>PPb | .005<br>PPm |
| FEED WATER | 3<br>PPm | <DL | <DL | <DL | -- | <DL | 31<br>PPm |
| EFFLUENT<br>WATER<br>5 GAL | <DL | <DL | -- | <DL | -- | <DL | 0.6<br>PPm |
| 10 GAL | <DL | <DL | -- | <DL | -- | <DL | 1<br>PPm |
| 20 GAL | <DL | <DL | -- | <DL | -- | <DL | 1.5<br>PPm |
| 30 GAL | <DL | <DL | -- | <DL | -- | <DL | 2<br>PPm |
| 40 GAL | <DL | <DL | -- | <DL | -- | <DL | 6<br>PPm |
| 50 GAL | <DL | <DL | -- | <DL | -- | <DL | 10<br>PPm |
| 60 GAL | <DL | <DL | -- | <DL | -- | <DL | 12<br>PPm |
| 70 GAL | <DL | <DL | -- | <DL | -- | <DL | 12<br>PPm |
| REMOVAL<br>EFFICIENCY | 100% | -- | -- | -- | -- | -- | 99% initial<br>59% final |

FIG. 7A

DL = Detection Limit

| K | Ca | Mg | Cl$^-$ | F$^-$ | SO$_4^{2-}$ | NO$_3^-$ |
|---|---|---|---|---|---|---|
| DCP | DCP | DCP | Reagent | Ion Selective Electrode | Reagent | Reagent |
| .01 PPm | .01 PPm | .005 PPm | 1 PPm | .1 PPm | .1 mg% | .01 PPm |
| 6.1 PPm | 14.5 PPm | 3.5 PPm | 4.0 PPm | 11 PPm | <DL | 5 PPm |
| <DL | .05 PPm | 0.01 PPm | <DL | <DL | -- | <DL |
| <DL | .06 PPm | .01 PPm | <DL | <DL | -- | <DL |
| <DL | 0.05 PPm | 0.01 PPm | <DL | <DL | -- | <DL |
| <DL | 0.06 PPm | 0.01 PPm | 5 PPm | <DL | -- | <DL |
| <DL | 0.08 PPm | 0.01 PPm | 8 PPm | <DL | -- | <DL |
| <DL | 0.08 PPm | 0.01 PPm | 8 PPm | <DL | -- | <DL |
| <DL | 0.08 PPm | 0.01 PPm | 15 PPm | <DL | -- | <DL |
| <DL | 0.08 PPm | 0.01 PPm | 20 PPm | <DL | -- | <DL |
| 100% | 99.5% | 99.6% | 100% initial 50% final | 100% | -- | 100% |

FIG. 7B

DL = Detection Limit

| Free Chlorine | Chloramine | pH |
|---|---|---|
| Reagent | Reagent | pH meter |
| .1 PPm | .1 PPm | -- |
| 1 PPm | 1 PPm | 8.2 |
| <DL | <DL | 5.45 |
| <DL | <DL | 5.2 |
| <DL | <DL | 5.0 |
| <DL | <DL | 5.0 |
| <DL | <DL | 5.0 |
| <DL | <DL | 5.0 |
| <DL | <DL | 4.9 |
| <DL | <DL | 4.7 |
| 100% | 100% | -- |

FIG. 7C

REMOVAL OF TOXIC INORGANIC CONTAMINANTS FROM TAP WATER AT 5°C

NOTE: (i) Adsorption test results scaled up to 1500 gm cartridge for treatment of 70 gal. water (ii) DL = Detection Limit

| TOXIC CHEMICALS | LEVEL TESTED | REMOVAL EFFICIENCY | LEVEL IN EFFLUENT | AMT. OF WATER TREATED BEFORE BREAKTHROUGH (ABOVE AAMI STD.) | AAMI STD. |
|---|---|---|---|---|---|
| Al (soluble) | 500 PPb | 100% | Below DL (DCP 2 PPb) | > 70 gal. | 10 PPb |
| F$^-$ (NaF) | 100 PPm | 100% | Below DL (F select electrode .1 PPm) | > 70 gal. | 0.2 PPb |
| SO$_4^{2-}$ (Na$_2$SO$_4$) | 200 PPm | 100% | Below DL (Reagent 0.1 mg%) | > 70 gal. | 100 PPm |
| Pb (Pb(NO$_3$)$_2$) | 10 PPm | 100% | Below DL (DCP 5 PPb) | > 70 gal. | 50 PPb |

FIG. 8A

| | | | | |
|---|---|---|---|---|
| NO$_3$ (NaNO$_3$) | 200 PPm | 100% | Below DL (Reagent 0.01 PPm) | > 70 gal. | 2 PPm (N) |
| Ca/Mg (Hardness) | 100 PPm | 100% | Below DL (DCP 0.01 PPm) | > 70 gal. | 4 PPm (Ca) |
| Cu (CuSO$_4$) | 100 PPm | 100% | Below DL (DCP 5 PPb) | > 70 gal. | 0.1 PPm |
| As (arsenate) | 10 PPm | 100% | Below DL (DCP 5 PPb) | > 70 gal. | 5 PPb |
| Ba (BaCl$_2$) | 100 PPm | 100% | Below DL (DCP 5 PPb) | > 70 gal. | .01 PPm |
| Cd (CdCl$_2$) | 100 PPm | 100% | Below DL (DCP 0.05 PPm) | > 70 gal. | .001 PPm |
| Hg (Hg(NO$_3$)$_2$) | 10 PPm | 100% | Below DL (Flameless AA .05 PPm) | > 70 gal. | .2 PPb |
| Ag (AgNO$_3$) | 10 PPm | 100% | Below DL (DCP 5 PPb) | > 70 gal. | 5 PPb |
| Cr (CrCl$_3$) | 100 PPm | 100% | Below DL (DCP .5 PPb) | > 70 gal. | .02 PPm |

FIG.8B

WATER PURIFICATION CARTRIDGE USING ZIRCONIUM ION-EXCHANGE SORBENTS

This application is a National Stage Application of PCT/US2010/054068, filed Oct. 26, 2010, which claims the benefit under 35 U.S.C. §119(e) of prior U.S. Provisional Patent Application No. 61/267,125, filed Dec. 7, 2009, which is incorporated in its entirety by reference herein.

FIELD OF THE INVENTION

The present invention relates to water purification. More particularly, the present invention relates to ion-exchange materials and in particular, to zirconium ion-exchange materials that are useful in water purification.

BACKGROUND OF THE INVENTION

Typically, water from municipal water supplies, must be purified or treated, in order to reduce the level of contaminants present in the water to levels that are acceptable for consumption, or other human use. Contaminants which may be present in municipal tap water include, for example, toxic ionic contaminants, organic compounds, microbes, mold, and/or algae. The required standard of water quality varies depending upon application and may be regulated by various government agencies and trade organizations. Drinking water, for example, must meet the requirements of the National Secondary Drinking Water Regulations, issued by the U.S. Environmental Protection Agency (EPA). The water quality for water used in hemodialysis must meet standards set by the Association for the Advancement of Medical Instrumentation (AAMI) (and subsequently approved by the American National Standards Institute [ANSI]) (ANSI-AAMI water standards). The ANSI-AAMI water standards far exceed the standards required for drinking water. This is because, during dialysis, a large amount of water is almost directly in contact with the patient's blood (separated by only the thin semipermeable membrane of the dialyzer). As such, it is very important that contaminants which are typically present in tap water, be removed prior to use in dialysis.

Sorption processes are generally ideal for removing contaminants from water. Sorbent processes are operationally simple, require virtually no start-up time, and are forgiving toward fluctuations in feed compositions.

Zirconium ion-exchange resins, and particularly, mixed bed ion-exchange resins, can provide useful sorbents for de-ionizing water and removing toxic contaminants in water. Zirconium ion-exchange sorbents are safe and non-toxic. Zirconium resins can remove endotoxins (bacteria) and bacteria does not proliferate in zirconium ion-exchange resins, as they do in organic ion-exchange resins. The zirconium ion-exchange resins are also not vulnerable to attack by chlorine and are thermally stable so that they can be used to treat water, even at high temperatures. Zirconium ion-exchange resins provide a more economical and compact water purification system than conventional water purification systems, such as reverse osmosis (RO) systems, and organic ion-exchange resins. Zirconium ion-exchange resins can efficiently remove toxic inorganic chemicals, especially at high concentrations. Zirconium ion-exchange resins can be configured in a compact form for use in disposable water treatment devices.

In the past, zirconium ion-exchange sorbents which contain ZrP in the Na$^+$ form, for example Na$^+$—ZrP, and HZO in the Cl$^-$ form, for example HZO—Cl$^-$, could not be used effectively primarily because of the following factors:

(i) The adsorption capacity and selectivity of ZrP and HZO are affected by the form of counter ions carried by the ion-exchange materials. For example, deionization of water is not possible when ZrP is used in the Na$^+$ form (Na$^+$—ZrP) and HZO is used in the Cl$^-$ form (HZO—Cl$^-$) due to the release of Na$^+$ and Cl$^-$ ions by the ion-exchange reactions as follows:

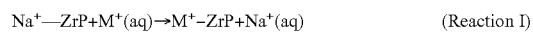  (Reaction I)

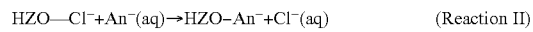  (Reaction II)

Thus, the mixing of ZrP and HZO in this case can, at most, produce the effect of water softening. The loading of the counter ions in these materials further reduces capacity for other ions and limit their use due to the selectivity of ionic adsorption. For example, HZO.Ac (where Ac$^-$=acetate ion) has little adsorption capacity for chloride and nitrate because these anions lie below acetate in the affinity series.

(ii) Deionization of water is affected by leachable PO$_4^{3-}$ from ZrP and Na$^+$ from HZO; and (iii) The small particle size of Na$^+$—ZrP and HZO—Cl$^-$ results in high resistance to water flow.

Zirconium ion-exchange sorbents for purifying water, which contain only a mixture of acid zirconium phosphate (AZP) and alkaline hydrous zirconium oxide (NaHZO), and no other zirconium ion-exchange resin, also suffer drawbacks. In conventional mixed bed ion-exchange resins, the displacement of previously adsorbed cationic contaminants (e.g. Ca$^{2+}$, K$^+$, Mg$^{2+}$) from AZP by excessive hydrogen ions can be a problem due to the weak affinity of the contaminants that can cause a leakage problem. Also, cationic contaminants, with strong sorption affinity can displace each other after adsorption by AZP.

Accordingly, there is a need for a more effective sorbent for selective de-ionizing and removal of contaminants from water. There is also a need for sorbent that can remove the target contaminant without causing significant changes in pH or in the composition of the influent water as caused by the pH change.

SUMMARY OF THE PRESENT INVENTION

A feature of the present invention is to provide a cartridge for purifying water that avoids one or more of the above mentioned disadvantages.

Another feature of the present invention is to provide a cartridge for purifying water that can provide water having a Na$^+$ content of 70 ppm or less.

Another feature of the present invention is to provide an improved ion-exchange material for purifying water that does not release Na$^+$ ions into the water.

A further feature of the present invention is to provide a cartridge for purifying water that can provide water having a pH of about 6 to about 7.

An additional feature of the present invention is to provide a non-toxic cartridge for purifying water, that includes inorganic ion-exchange resins.

An additional feature of the present invention is to provide a cartridge for purifying water that is compact and economical.

Another feature of the present invention involves removing the organics and/or the endotoxins and/or chlorine and chloramines to meet ANSI-AAMI standards.

Additional advantages of the present invention will be set forth in part in the description that follows, and in part will be apparent from the description, or may be learned by practice of the present invention. The goals and advantages of the present invention will be realized and attained by means of the elements particularly pointed out in the appended claims.

To achieve the above noted goals and in accordance with the purposes of the present invention, as embodied and broadly described herein, the present invention provides a cartridge having a first layer having sodium zirconium phosphate (NaZrP), and a second layer having a combination of acid zirconium phosphate (AZP) and alkaline hydrous zirconium oxide (NaHZO) in the cartridge. A layer(s) of activated carbon can be present, such as before the "first layer." The second layer can succeed the first layer. The first layer and the second layer can be separated by one or more separators, such as, filter paper. The NaZrP, the AZP, and/or the NaHZO can be particles having an average grain size of from about 25 microns to about 60 microns.

The cartridge can comprise a combination of AZP and NaHZO and can be present as a homogeneous mixture wherein the AZP and the NaHZO are uniformly distributed as a layer in the cartridge.

The present invention also provides a cartridge comprising a combination of AZP and NaHZO in the cartridge, wherein the weight ratio of AZP to NaHZO can be varied.

The present invention further provides a method to purify water comprising passing water through the cartridge.

The present invention further provides a method to purify municipal water, waste water, well water, natural water, or any combination thereof.

The present invention provides a cartridge that can be used to purify water to meet ANSI-AAMI water standards for dialysis treatment or for other water purification standards.

The present invention provides a method for preparing purified fresh dialysate for dialysis comprising passing water through the cartridge, prior to conducting dialysis.

It is to be understood that both the foregoing general description and the following detailed description are exemplary only and are not restrictive of the present invention, as claimed.

BRIEF DESCRIPTION OF THE DRAWINGS

FIG. 4A-4C is a table showing the purity level of effluent from a cartridge of the present invention.

FIG. 5A-5C is a table showing the purity level of effluent from a cartridge of the present invention.

FIG. 6A-6C is a table showing the purity level of effluent from a cartridge of the present invention.

FIG. 7A-7C is a table showing the purity level of effluent from a cartridge of the present invention.

FIG. 8A-8B is a table showing the purity level of effluent from a cartridge of the present invention.

DETAILED DESCRIPTION OF THE INVENTION

Figure 1:
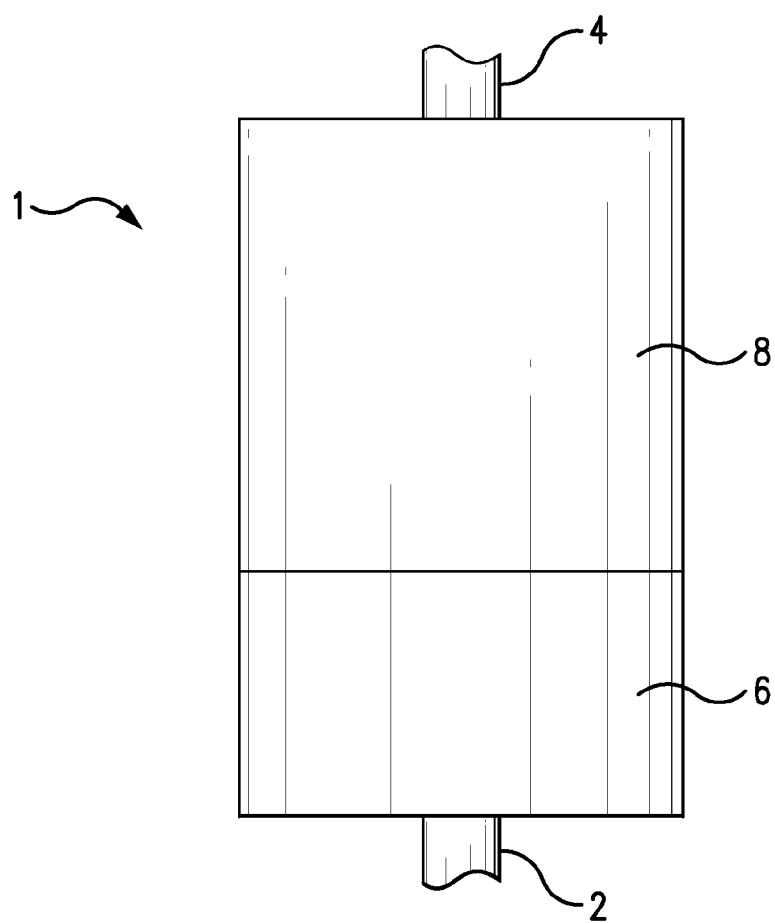
FIG. 1 is a schematic diagram of a cartridge according to various embodiments.

The present invention relates, in part, to a water purification cartridge or sorbent cartridge or a cartridge to purify substances, such as liquids, using inorganic ion-exchange material and/or sorbents. The cartridge can be used with a variety of feed waters to remove at least a portion, all, or substantially all contaminants present in the water. The cartridge can produce a consistent, high quality water supply to meet the requirements of food, beverage, and/or health industries. The purified water can be used, for example, in cooking, drinking, hot and cold beverage production, brewing, washing and/or ice making. Water purified in accordance with the present invention can also be used in dialysis systems, as well as for medical, pharmaceutical, or industrial or residential-related purposes.

The cartridge can be a compact column that contains at least two layers of zirconium ion-exchange resins. The cartridge can purify water from a water supply, such as a municipal water supply that has a water quality that meets or even fails to meet the EPA Primary and Secondary drinking water standards at the maximum allowable contamination level (MACL).

The cartridge can be used to purify water to meet the ANSI-AAMI requirement for purifying water used for dialysate. The cartridge of the present invention can remove $Na^+$ and $Cl^-$ ions from a municipal water supply in order to meet the ANSI-AAMI water quality standard for dialysate preparation. The cartridge can, for example, be used to reduce $Na^+$ content in water to 70 ppm or less (e.g., 65 ppm to 1 ppm, 50 ppm to 5 ppm), in accordance with the ANSI-AAMI requirement. The cartridge can be used for single dialysis treatments to avoid bacterial proliferation and/or can further remove endotoxins to meet ANSI-AAMI standards.

The cartridge can remove at least a portion of one or more of the following: toxic cations and anions, organics, chlorine, chloramine, microbes, mold, algae, silt particles, and/or colloidal matter. The cartridge can remove hardness metals, $Ca^{2+}$, $Mg^{2+}$, as well as excessive $K^+$, and excessive $Na^+$, from water. The cartridge can be used to efficiently remove from municipal water other toxic inorganic contaminants, such as aluminum, fluoride, and nitrate, even when such contaminants are present at high levels. For each of these impurities, the present invention can remove some, almost all, or all of these impurities and/or contaminants.

The cartridge can comprise zirconium ion-exchange resins. The cartridge can comprise, or consist essentially of or consist of a first layer having sodium zirconium phosphate (NaZrP), and a second layer having a mixed-bed or combination of acid zirconium phosphate (AZP) and alkaline hydrous zirconium oxide (NaHZO). The first layer can comprise, or consist essentially of, or consist of NaZrP. The second layer can comprise, or consist essentially of, or consist of AZP and NaHZO. For purposes of the present invention, sodium zirconium phosphate or NaZrP, means the $Na^+$ form of zirconium phosphate (ZrP) or acid ZrP titrated by NaOH to a pH of from about 6.0 to about 7.4, and preferably, a pH of from about 6.5 to about 7.0. NaZrP can have the following chemical and physical properties:

Composition: $(H^+)_x (Na^+)_z (ZrO_2)(OH^-)_y (PO_4)_{1.8\text{-}2} \cdot nH_2O$, or Na Wt %: 4-6; $ZrO_2$ Wt %: 34-37; Phosphate Wt %: 41-43; $H_2O$: 14-18 wt %

Ion-exchange formula: $[ZrO_2 (OH)_y (PO_4)_2]^{2-} \cdot H^+_x Na^+_z$

Structural formula: same as for AZP below except one, two, three, or more of the $H^+$ are replaced with $Na^+$ in the formula.

For purposes of the present invention, acid zirconium phosphate, or AZP, means the $H^+$ form of zirconium phosphate. AZP can have the following chemical and physical properties:

Composition: $(H^+)_x (ZrO_2) (OH^-)_y (PO_4)_{1.8\text{-}2.0} \cdot nH_2O$
Ion-exchange formula: $[ZrO_2 (OH)_y (PO_4)_2]^{2-} \cdot H^+_x$
Structural formula:

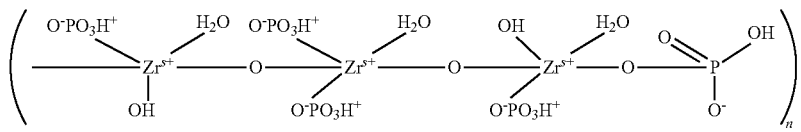

wherein x for H$^+$ is 1.5 to 2.0, y for OH$^-$ is 0.5 to 0, and n for H$_2$O and for the structural formula is 1 to 4. x, y, and n can be any decimal in these ranges and can optionally be above or below these ranges. The AZP can have a hydrogen ion content of, for example, from about 2-10 mEq H$^+$/g AZP, from about 4-8 mEq H$^+$/g AZP, or from about 5-7 mEq H$^+$/g AZP. The AZP can have a pH in water (1 g/100 ml) of, for example, about 0.5-5, or about 1-3, and a pH in brine (1 g/100 ml) of, for example, about 0-5, or about 0.5-1.5.

For purposes of the present invention, alkaline hydrous zirconium oxide, or NaHZO, means the alkaline form of hydrous zirconium oxide (ZrO(OH)$_2$), in which the zirconium oxide is hydroxylated. NaHZO can have the following chemical and physical properties:
Composition: Na$^+_x$ZrO$_2$ (OH$^-$)$_y$.n H$_2$O
Ion-exchange formula: ZrO$_2$.OH$^-$
Structural formula:

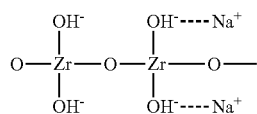

wherein x for Na$^+$ is 1, y for OH$^-$ is 2 to 4 and n for H$_2$O is 4 to 6, and x, y, and n can be any decimal in these ranges and can optionally be above or below these ranges. The NaHZO can have a Na$^+$ content Na:ZrO$_2$ (molar ratio) in a range of, for example, from about 0.5:1.5, about 1:1, or about 1.5:0.5, and/or have a hydroxyl ion content in a range of, for example, about 3-12 mEq OH$^-$/10 g NaHZO, about 5-10 mEq OH$^-$/10 g NaHZO, or about 6-9 mEq OH$^-$/10 g NaHZO. The NaHZO can have a pH in water (1 g/100 ml) of, for example, about 7-14, about 9-12, or about 10-11.

The present invention, in part, is based on the following mechanisms: (1) binding by NaZrP of Ca$^{2+}$, K$^+$, Mg$^+$, and/or toxic trace metals present in water, in exchange for release of Na$^+$; (2) binding of Na$^+$, released into the water in (1) to ZrP, in exchange for release of H$^+$; (3) binding of anionic contaminants in the water to NaHZO, in exchange for release of OH$^-$. The reactions of (2) and (3), or the ion-exchange interaction which takes place at the second or "mixed-bed" layer, can proceed as shown below:

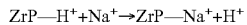

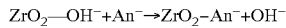

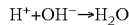

It should be understood that the phrase "substantially all" or "almost all," as used herein, can represent an amount of about, for example, 90%-99.9%, 95% to 99%, 96% to 99.9%, 55%-99.9%, 60%-80%, or 65%-70%, by weight, based on the total amount of contaminants or impurities present.

As described in more detail below, the combination of AZP and NaHZO, or the mixed-bed layer of the cartridge can efficiently and simultaneously adsorb cations and anions from water in exchange for release of H$^+$ and OH$^+$. In contrast, when ZrP in the H$^+$ form (i.e. H$^+$—ZrP) is used alone, the adsorption capacity for other metal ions in water, particularly Ca$^{2+}$, Mg$^{2+}$, K$^+$, and Na$^+$, is greatly reduced. It is believed that these metal ions cannot easily displace the H$^+$ ions which have a high affinity for ZrP. Also, when using the acid ZrP alone, the H$^+$ ions are not easily displaced by other metals when the pH of water in contact with the acid ZrP bed is low. It is believed that the adsorption capacity of ZrP increases with higher pH of the water. The affinity series of ZrP for cations can be expressed as follows:
(NH$_4^+$>H$^+$>Cu$^{2+}$, Ba$^{2+}$, Pb$^{2+}$, Ag+, Cd$^{2+}$, Hg$^{2+}$, Zn>Cr$^{+3}$, Mn$^{2+}$, Fe$^{+2}$>Ca$^{2+}$>Na$^+$, Mg$^{2+}$, K$^+$)

Similarly, when HZO in the OH$^-$ form (i.e. HZO—OH$^-$) is used alone, the adsorption capacity for other anions in water is greatly reduced because of the high affinity of HZO for OH$^-$ ions. It is believed that the anions cannot easily displace the OH$^-$ ions due to the ion-exchange reaction. Also, when using the alkaline HZO alone, the OH$^-$ ions are not easily displaced by other anions when the pH of water in contact with the alkaline HZO bed is high. It is believed that adsorption capacity of HZO increases with lower pH of the material. The affinity series of HZO for anions can be expressed as follows:

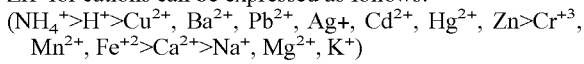

The cartridge of the present invention can deionize water effectively. The cartridge can include a cartridge having a zirconium sorbent layer comprising ZrP in the Na$^+$ form, followed by a separate zirconium sorbent layer comprising a blended mixture of acid zirconium phosphate, for example, H$^+$—ZrP and alkaline hydrous zirconium oxide, for example, HZO—OH$^-$. The ZrP in the Na$^+$ form can remove all of the cations in the feed water other than Na$^+$. The ZrP in the Na$^+$ form can remove, for example, Ca$^{2+}$, Mg$^{2+}$, K$^+$, NH$_4^+$, and all the other transitional and heavy metal ions by the ion exchange reaction described previously (Reaction I). The released Na$^+$ from this layer is then removed by the H$^+$—ZrP in the succeeding layer that has a blended mixture of H$^+$—ZrP and HZO—OH$^-$. This is feasible because the OH$^-$ ion of the alkaline HZO tends to extract the H$^+$ from the H$^+$—ZrP and promote ion-exchange with the Na$^+$ ion in water. In other words, the ion exchange reaction of Na$^+$ in water with H$^+$ in ZrP is promoted because of elevation of pH by the alkaline HZO. The reaction can be illustrated as follows:

(Reaction III)

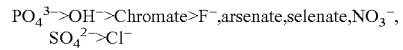

The H$^+$—ZrP can also capture any leakage of other metal ions from the previous Na$^+$—ZrP layer in this way. The preceding layer of Na$^+$—ZrP removes the K$^+$, Mg$^{2+}$, and Ca$^{2+}$ because the affinity of H$^+$—ZrP for these cations are very weak. Without the Na$^+$—ZrP layer, the K$^+$, Mg$^{2+}$, and Ca$^{2+}$ can displace each other in the H$^+$—ZrP-containing layer causing leakage of all these metals, as described previously.

The alkaline HZO in the OH⁻ form of the mixed-bed layer can remove anions in the feed water. The $H^+$ ions of the $H^+$—ZrP tend to extract the $OH^-$ ion from the HZO—OH⁻ and promote ion-exchange with the anions in water. In other words, the pH of water in contact with HZO+OH⁻ is lowered by the $H^+$—ZrP. The reaction can be illustrated as follows:

(Reaction IV)

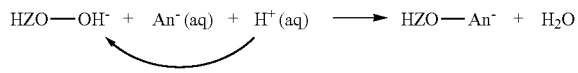

Thus, upon blending of $H^+$—ZrP and HZO—OH⁻, the capacity of simultaneous adsorption of both cations and anions is greatly increased because the pH of the aqueous medium in contact with the material is then close to neutral. The reaction mechanism of the mixed bed $H^+$—ZP/HZO—OH⁻ layer for deionizing or desalinating water can be represented by the following expressions:

Desalination:

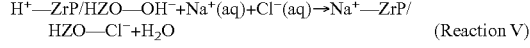

(Reaction V)

Deionization:

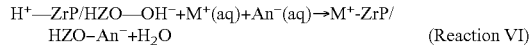

(Reaction VI)

As shown in Reactions V and VI above, in the mixed bed layer, cations and anions can be removed simultaneously from water in exchange for release of $H^+$ and $OH^-$ ions which combine to produce water molecules regardless of ionic selectivity because the layers are not loaded with other counter ions. Chemicals derived from processing and slight dissociation of ZrP and HZO in water (e.g. phosphate from ZrP; $Na^+$ from HZO) can also be removed. For example, phosphate derived from ZrP and $Na^+$ derived from HZO, can also be removed from the water. The phosphate can be adsorbed by HZO, whereas the sodium is removed by the AZP and due to Rxn III above.

The $H^+$—ZrP/HZO—OH⁻ mixed-bed layer and the $Na^+$—ZrP layer can be used for treating or purifying water. The $H^+$—ZrP/HZO—OH⁻ blended layer and the $Na^+$—ZrP layer are chemically stable under general conditions and do not dissociate in water to produce soluble Zr at detectable levels. Furthermore, the $H^+$—ZrP, HZO—OH⁻, and the $Na^+$—ZrP, offer little resistance to water flow as the particle size for these chemicals can be 45-90 microns (or sizes below or above this range).

The cartridge with the $H^+$—ZrP/HZO—OH⁻ blended layer and the $Na^+$—ZrP layer, can remove toxic inorganic contaminants from water with high efficiency. For example, the cartridge can remove about 85-100%, such as 90-100%, 92-100%, 96-100%, 98-100%, 99-100%, or 99.8-100% by weight of toxic inorganic contaminants from water, based on the total amount of toxic inorganic contaminants present. The cartridge can remove the toxic organics, endotoxins, chlorines, and/or chloramines that allow the cartridge to produce water quality that satisfies ANSI-AAMI standards for dialysis (2007, 2008, or 2009 standards). The cartridge can purify municipal water and render the water safe for human consumption and use. The cartridge can provide a product water having a water quality that complies with the ANSI-AAMI standard for renal dialysis. Unless stated otherwise, all standards are the ones in place as of 2007, 2008, and/or 2009.

As described previously, removal of $Ca^{2+}$, $K^+$ $Mg^{2+}$ by the first or NaZrP-containing layer, prevents displacement of these metals in the succeeding second layer containing the AZP/NaHZO combination. Consequently, leakage of these metals into the product water is prevented. Further, the cationic ion-exchange properties of the $H^+$ form of ZrP (i.e. AZP) when acting alone, for example, in a separate layer in a cartridge, does not readily release $H^+$ in exchange for $Na^+$, or other cations that may be present in tap water. When in the presence of a base, however, the base can serve to extract the $H^+$ ions out from AZP which are then replaced by the cation adsorbed. Accordingly, when blended with NaHZO, for example, as a homogeneous mixture, the ion-exchange properties of AZP can be affected. The ability of AZP, for example, to release $H^+$ in exchange for other cations increases. A combination of AZP and NaHZO can efficiently adsorb cations from tap water. Without wishing to be bound to any theory, one possible reason may be that the $OH^-$ groups present in NaHZO, and their interaction with $H^+$ in AZP, may be responsible for the altered ion-exchange properties.

The anionic ion-exchange properties of NaHZO, having adsorption capacities for $PO_4^{2-}$, $F^-$, $SO_4^{2-}$ and other anions, can be altered when acted upon by an acidic pH, for example, a pH less than 7. In the presence of acid, the NaHZO can be alkaline in water, releasing $OH^-$ ions in exchange for adsorption of other anions. The release of $OH^-$ ions can remove acid entities from water ($CO_2$ gas or $H^+$ ions) and help keep the pH of the product water in an acceptable range (e.g., pH of 6.0 to 7.4).

The combination of AZP and NaHZO can be present as a homogeneous mixture, wherein the AZP and the NaHZO are uniformly distributed or mixed amongst each other, for instance, as one or more layers, in the cartridge. The present invention also relates, in part, to combinations of AZP and NaHZO wherein the weight ratio of AZP to NaHZO can be varied. By adjusting (e.g., lowering or raising) the proportion of NaHZO, for example, the combination of AZP and NaHZO can further control the pH of the purified product water.

The NaZrP can be present in the cartridge as at least one layer. The NaZrP can be present in at least one layer as NaZrP particles. The NaZrP particles can be present in at least one layer alone or in combination with other materials described herein. The NaZrP particles can have an average size of, for example, about 25 microns to about 60 microns.

The combination of AZP and NaHZO can be present together in the cartridge as at least one layer. The cartridge can comprise at least two layers and the cartridge can comprise at least one other layer comprising NaZrP. The combination of AZP and NaHZO can be present in the cartridge as AZP particles and NaHZO particles having an average size, for example, of from about 25 microns to about 60 microns.

The NaZrP can be prepared by reacting aqueous solutions of a zirconium salt and phosphoric acid or can be prepared using a solid Zr compound(s) with phosphoric acid(s). The aqueous solutions of a zirconium salt and phosphoric acid can be reacted in a reactor vessel fitted with an agitator. The solutions can be allowed to react in the reaction vessel at room temperature with a moderate agitator rate. Then, while maintaining agitation at the same speed, the slurry of the precipitate can be titrated to a pH of about 6.0 to 7.4, or around 6.5 to 7.0, for instance, by adding 50% NaOH. After titration, the material can be allowed to sit again for 30 minutes without agitation. The reaction forms a slurry that is filtered and washed and then dried such as to a moisture level of 16 to 20 weight percent Loss on Drying (LOD). Other LODs are possible. The product can be a free-flowing powder having a particle size range of 5-150 microns. The NaZrP can comprise, for example, particles having an average particle size of about 10-80 microns, about 25-60 microns, about 25-45 microns, about 30-60 microns, about 45-90 microns, about 70-100 microns, or about 100-150 microns. Using sol-gel techniques, the particle size can be controlled. The NaZrP can be prepared, for example, by following the methods described in U.S. Pat. No. 7,566,432, incorporated in its entirety by reference herein.

The AZP can be prepared by a reaction between aqueous solutions of a zirconium salt and phosphoric acid or can be prepared using a solid zirconium compound(s) with phosphoris acid(s). The reaction forms a gelatinous precipitate that is filtered and washed until excessive phosphoric acid is removed, and then dried in an oven, such as to a moisture level of from about 12 to 18 weight percent Loss on Drying (LOD). Other LODs are possible. The final product after drying can be a fine powder or granules, such as with an irregular form. The AZP can comprise, for example, particles having an average particle size of about 5-100 microns, about 10-80 microns, about 25-60 microns, or about 25-45 microns. The average grain size is not limited to these ranges and can be sizes above or below these ranges. Using sol-gel techniques, the particle size can be controlled.

The AZP can be prepared, for example, by following the methods disclosed in U.S. Pat. No. 6,818,196, which is incorporated in its entirety by reference herein. Briefly, AZP can be prepared by heating zirconium oxychloride (ZOC) with soda ash to form sodium zirconium carbonate, and treating the sodium zirconium carbonate with caustic soda to form alkaline hydrous zirconium oxide. An aqueous slurry of the alkaline hydrous zirconium oxide can then be heated while adding phosphoric acid and an acid zirconium phosphate recovered. An aqueous slurry of the AZP can also be titrated with a basic agent, such as caustic soda, until a desired pH is reached, for example, a pH of from about 5 to about 7.

Alternatively, the AZP can be prepared by heating an aqueous mixture of basic zirconium sulfate (BZS) and phosphoric acid at a sufficient temperature (e.g., 180° F.-190° F.) and for a sufficient time (e.g., 1-2 hr) to form acid zirconium phosphate precipitate. Then the solution can be cooled and the acid zirconium phosphate can be filtered and washed to reduce unreacted leachable phosphate levels. The AZP particles can be further dried, for example, at about 120° F.-170° F. The AZP particles can have a BET surface area of less than $2 m^2/g$. By way of example, the AZP can be prepared as described in Example 1.

The AZP can be prepared, for example, by following the methods disclosed in U.S. Patent Application Publication 2006/0140840, which is incorporated in its entirety by reference herein in combination with the teachings provided herein. Briefly, AZP can be prepared by preparing a solution of zirconium oxychloride (ZOC) and an organic chemical additive in water, and then titrating with concentrated hydrochloric acid (HCl) to fully dissolve the precipitate. This ZOC solution is then added to a solution of phosphoric acid to produce a slurry of AZP precipitate. The precipitate is then filtered and washed. The AZP particles can have a BET surface area greater than $10 m^2/g$. By way of example, AZP can be prepared as described in Example 2.

Alkaline hydrous zirconium oxide can be prepared by the reaction of a zirconium salt, for example, BZS, or its solution in water (for instance, by a sol-gel method) with an alkali metal (or alkali metal compound) at ambient temperature, to form a NaHZO precipitate. The NaHZO particles can be filtered and washed until the anions of the zirconium salt are completely removed, and then preferably air dried, or dried in an oven at mild temperature (e.g., 60° F. to less than 90° F.) to a moisture level, for instance, of from about 25-30 weight percent LOD or lower, to form a free-flowing powder. Other LODs can be achieved, although higher temperature (e.g. 90° F.-120° F.) and/or long drying time (e.g. 24-48 hrs) to achieve a lower moisture level (i.e., <20 weight percent LOD) can convert the zirconium-hydroxide bond to a zirconium-oxide bond and reduce the adsorption capacity as well as alkalinity of the anion-exchange material. The drying temperatures refer to the nominal temperature in the oven or dryer. The NaHZO can comprise particles having an average grain size of about 10-100 microns, about 20-80 microns, about 25-60 microns, or about 25-40 microns. The average grain size is not limited to these ranges and can be sizes above or below these ranges. The NaHZO can have a BET surface area of less than $2 m^2/g$. By way of example, the NaHZO can be prepared as described in Example 3.

The NaHZO can be prepared, for example, by following the methods disclosed in U.S. Patent Application Publication 2006/0140840, which is incorporated in its entirety by reference herein, in combination with the teachings provided herein. Briefly, this method of preparing NaHZO involves adding an aqueous solution of ZOC, titrated with concentrated HCl, to an aqueous solution of caustic soda. The HCl addition can prevent excessive gelation during the precipitation process as well as to promote particle growth. The NaHZO particles can have a BET surface area of greater than $10 m^2/g$. By way of example, the NaHZO can be prepared as described in Example 4.

The cartridge can contain granular activated carbon (GAC). The GAC can be present as a separate layer in the cartridge. The cartridge can comprise, consist essentially of, or consists of at least three layers, wherein one layer of the cartridge can comprise GAC, and the remaining two layers can comprise ion-exchange resins. For example, one layer of the cartridge can comprise GAC, another layer can comprise NaZrP, and the remaining layer can comprise a combination of AZP/NaHZO. The GAC can be useful to bind and remove chlorines, chloramines, organics, $H_2S$, and/or microbes present in the water. It is preferable that a GAC layer be disposed before or precede the ion-exchange resins present in the cartridge. Also, the layer of activated carbon can be disposed before the zirconium sorbents so that toxic trace metals leached out from the layer of activated carbon can be removed by the zirconium sorbents.

The cartridge can be functional in a wide range of temperatures. The cartridge can be functional in a temperature range of 0° C.-100° C., such as, 20° C.-90° C., 30° C.-70° C., or 40° C.-80° C.

Various filter media sections or sorbent materials within a tubular housing or cartridge can be used with the NaZrP, AZP and NaHZO of the present invention. The housing or cartridge can, for example, include one or more additional ion-exchange sections, one or more additional GAC sections. The cartridge can include filter media, such as one or more separator pads, filter pads, or filter paper, to separate the layers of the cartridge and/or to provide additional filtering of the water. The housing or cartridge can include a carbon pre-filter, such as a carbon pad, for removing turbidity, chlorine, chloramine, microbes, and/or other particles in the water, such as silt and/or colloidal matter. The carbon pad can make the cartridge more compact. It should be understood, however, that while a carbon pre-filter can be included, a carbon pre-filter is not required in the cartridge.

The housing of the cartridge can be made from any material, for example, any suitable impermeable polymeric and/or glass material. The housing or cartridge can be made from polycarbonate. The housing or cartridge can have any suitable shape, for example, the housing or cartridge can be cylindrical, rectangular, or square shaped.

The cartridge can be configured to purify water in any desired amount. The dimensions of a housing or cartridge, and/or the amount of components in the cartridge, which would be necessary to purify a desired quantity of water, can be readily determined. For example, a cartridge suitable for purifying 10 liters of water can be configured as follows. The cartridge can have a height of about 6.0", an internal diameter of about 2", and a thickness of about 0.05". The cartridge can include various filter media sections or layers. At least one section or layer of the cartridge can include NaZrP in an amount of about 10-80 g, for example about 20 g, 30 g, 40 g, 50 g, 60 g, or 70 g, per cartridge. At least one section or layer of the cartridge can include a combination of AZP and NaHZO, wherein the AZP in the AZP/NaHZO-containing layer can be used in an amount, for example, of from about 40-100 g, for example, 50 g, 60 g, 70 g, 80 g, 90 g, or 100 g per cartridge. The NaHZO in the AZP/NaHZO-containing layer can be used in amount, for example, of from about 70-130 g, for example, 80 g, 90 g, 100 g, 110, or 120 g per cartridge. The cartridge can include at least one section or layer having granular activated carbon, in an amount of from 40-100 g, for example, 50 g, 60 g, 70 g, 80 g, or 90 g. As a more specific example, a 5-inch diameter column can contain from about 2,000 g to 2,500 g of zirconium sorbent material which can treat 300 to 500 gallons of water. For instance, the ratio of zirconium material (combined amount of NaZrP and AZP) to water treated can be about 2 grams to 10 grams of zirconium material per gallon of water to be treated.

The AZP and NaHZO can be present in any desired weight ratio. The weight ratio of NaHZO:AZP can range, for example, from about 0.2:0.8 to about 0.8:0.2, from about 0.5:0.5 to about 0.6:0.4, or from about 0.22:0.78 to about 0.33:0.67. The weight ratio of NaHZO:AZP can be, for example, 0.4:0.6. The various weight ratios of AZP and NaHZO can provide a mixture having any desired pH. A mixture of AZP and NaHZO can have a pH, for example, from about 3 to about 9, from about 3 to about 7, from about 3.5 to about 4, from about 4 to about 5.5, or from about 5.5 to about 6.

The NaZrP can be ZrP that is titrated to have any desired pH, for example, a pH of from about 5.5 to about 7.5, from about 6.0 to about 7.0, or from about 6.5 to about 7.0. Preferably, the ZrP is titrated to a pH of about 6.0 to about 7.4 or about 6.5 to about 7.0.

The zirconium ion-exchange resins are thermally stable and can be used to treat water even at high temperatures. The cartridge can be used to purify water of any temperature, for example, 1° C.-40° C., or 10° C.-30° C., or 20° C.-35° C. The zirconium ion-exchange resins can have a mesoporosity level (total pore vol.) of 0.03 to 0.08 ml/g and/or a BET surface area of 1 to 30 m$^2$/g with respect to ZP and a BET surface area of 20 to 100 m$^2$/g for HZO. The mesoporosity of the zirconium ion-exchange resins can help to reduce microorganisms, endotoxins, chlorines, and/or chloramines in feed water. The zirconium ion-exchange resins can be at least partially or entirely resistant to bacterial proliferation.

The cartridge can be used to purify water having any level of contamination. The cartridge can remove toxic inorganic chemicals, even when the contaminants are present at high concentrations. The cartridge can, for example, be used to purify water having one or more or all of the characteristics described in Table 1 below. Any combination of two or more characteristics is possible. The amounts provided are upper limits and the cartridge can achieve these levels or even lower levels, such as 10%, 20%, 30%, 40%, or 50% lower levels than shown in Table 1.

TABLE 1

| Endurance Limits of Feed Water Quality and Delivery Tested | |
|---|---|
| TDS | 500 ppm |
| Water hardness | 150 ppm CaCO$_3$ |
| Maximum contamination level of heavy metals and aluminum | 1000 ppm |
| Maximum contamination level of calcium, magnesium | 100 ppm |
| Maximum contamination level of anions; fluoride, sulfate, nitrate, arsenate | 100 ppm |
| Contamination level of organic challenged | 1500 ppm |
| Bacteria | 10$^6$ CFU/ml |
| Endotoxin | 10$^4$ EU/ml |
| Ionic level of feed water | 800 micromhos |
| PH of feed water | 4-9 |
| Temperature of feed water | 1° C.-40° C. |
| Flow rate (5" ID) | Maximum 600 ml/lmin |
| Delivery pressure head | 60 psi |

In general, a cartridge of the present invention can achieve one or more of the specific purity levels set forth in any one or more of Tables 3, 5-7, 8, 23, 22-23, or FIGS. 4-8.

The cartridge can contain one or more layers or zones of the NaZrP, AZP particles and NaHZO particles, wherein the cartridge has a plurality of filter media sections (or layers) including an arrangement, starting from a first end (inlet) and ending at a second end (outlet), an NaZrP section, a composite AZP/NaHZO section. As stated previously, the cartridge can optionally contain an activated carbon section.

Cartridges, as an option, do not have any other layers containing zirconium and/or zirconium containing components, other than the NaZrP, AZP, NaHZO layers as described herein.

Figure 2:
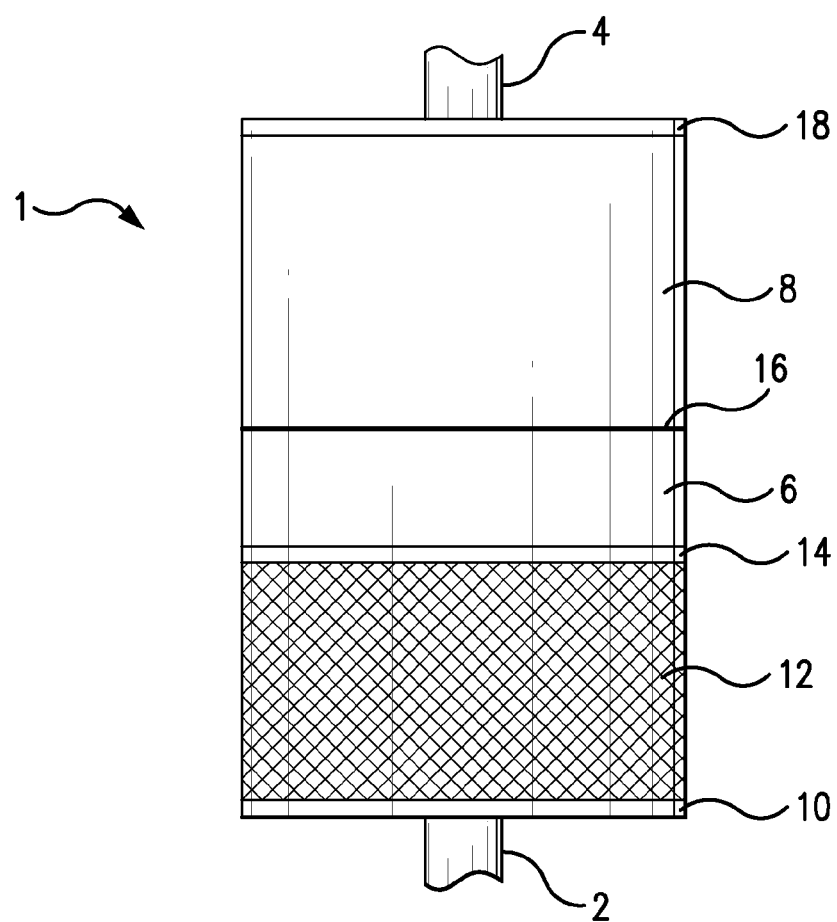
FIG. 2 is a schematic diagram of cartridges according to various embodiments.
Figure 3:
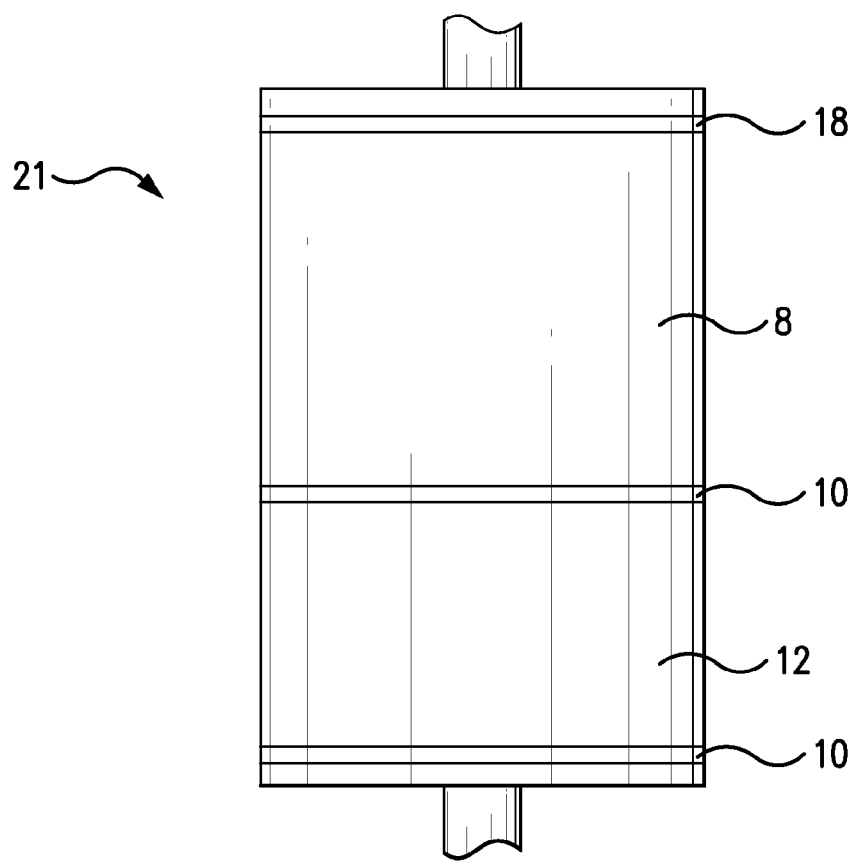
FIG. 3 is a schematic diagram of a cartridge.

Cartridges for water purification can be configured as shown, for example, in FIG. 1 and FIG. 2. As shown in FIG. 1, a cartridge (1) can have a first end having an inlet (2), and a second end having an outlet (4). Although not shown in the figures, the inlet can have control valve or pressure regulator to control the flow of water into the cartridge. The first end can be opposite from or opposing the second end. The cartridge can have a first layer containing NaZrP (NaZrP-containing layer) (6), and a second layer containing a combination of AZP and NaHZO (NaHZO/AZP-containing layer) (8). The first or NaZrP-containing layer (6) can be disposed nearer to the inlet (2) than the second or NaHZO/AZP-containing layer (8). The second layer (8) can succeed the first layer (6). The second layer (8) can be disposed nearer to the outlet (4) than the first layer (6). The NaZrP-containing layer (6) can remove toxic heavy metals, ammonia, NH$_4^+$, amine, K$^+$, and/or hardness metals, such as Ca$^{2+}$ and Mg$^{2+}$. The AZP in the AZP/NaHZO-containing layer (8) can remove Na$^+$ in the water, as well as microbes, mold, and/or algae in the water. The NaHZO in the AZP/NaHZO-containing layer (8) can remove toxic anions in the water, such as sulfate, nitrate, fluoride, chromate, selenate, and/or arsenate.

The cartridge (1) can have various filter media sections, for example, various filter media sections within a tubular housing or cartridge can be used with the NaZrP, AZP, NaHZO, GAC, of the present invention. FIG. 2 shows one arrangement of filter media sections in the cartridge (1). As shown in FIG. 2, the cartridge (1) can have a first layer containing NaZrP (6), and a second layer containing a combination of AZP and NaHZO (8), as described above for FIG. 1. The cartridge (1) may contain a carbon pad (10) adjacent the inlet (2). The carbon pad (10) can remove chlorines, chloramines, microbes, and/or other particles in water, such as, silt, and/or colloidal matter. The carbon pad (10) can be any suitable carbon pad known in the art. A layer of GAC (12) can succeed or be disposed immediately after the carbon pad (10). The GAC (12) can remove chlorine, chloramine, organics, $H_2S$, and/or microbes. The GAC (12) can be disposed adjacent the first or NaZrP-containing layer (6). A separator pad (14) can separate the GAC (12) and the NaZrP-containing layer (6). The separator pad (14) can remove turbidity of water. Filter paper (16) can be disposed between the first layer (6) and the second layer (8), to separate the first layer (6) and the second (8). A filter pad (18) can be disposed between the AZP/NaHZO-containing layer and the outlet (4). The filter pad (18) can prevent leakage of particles, provide packing support for the particulate material, and/or prevent channeling.

A method to purify water can comprise passing water through a cartridge of the present invention, as detailed above. Water that is purified by the cartridge can have a pH of about 5.8 to about 7.5, such as, about 6.0 to about 7.4, or about 6.0 to about 7.0. Water that is purified by the cartridge can have a $Na^+$ content of below 70 ppm, or 0 ppm to about 70 ppm, for example, 1 ppm to 60 ppm, or from about 15 ppm to about 50 ppm.

The cartridge for water purification can be utilized to purify tap water, municipal water, municipal drinking water, waste water, well water, and/or natural water. Waste water is understood to mean any water that has been adversely affected in quality by anthropogenic influence. Waste water can include liquid waste discharged by domestic residences, commercial properties, industry, and/or agriculture and can encompass a wide range of potential contaminants and concentrations. It should be understood that natural water can be water obtained from any natural source, for example, surface water, well water, precipitated water, and/or desalinated sea water.

Using the cartridge, water can be treated to reduce the level of contaminants to acceptable levels. Water that is purified by the cartridge can meet standards set forth for drinking water or human consumption by, such as, standards set forth by the U.S. Environmental Protection Agency (EPA) and the Food and Drug Administration (FDA). For example, water that is purified by the cartridge can achieve a level of purity that meets the requirements of the National Secondary Drinking Water Regulations, issued by the EPA and in place in 2007, 2008, or 2009.

Water that is purified by the cartridge can meet the ANSI-AAMI Water Standards for Dialysis. As such, the cartridge can be used to supply water to a hemodialysis machine or dialysis system. Purified, fresh dialysate for dialysis can be prepared by first passing tap water, to be used as a base for the dialysate, through the cartridge before entering the dialyzer. Contaminants present in tap water, such as, toxic metal ions, non-metal ions, and chlorine, can be removed (to acceptable limits) by the cartridge, prior to using the water as a base for dialysate. The dialyzer can be in fluid communication with the blood of a patient.

The present invention includes the following aspects/embodiments/features in any order and/or in any combination:

1. The present invention relates to a cartridge comprising:
   a first end having an inlet;
   a second end opposing the first end, the second end having an outlet;
   a first layer comprising sodium zirconium phosphate (NaZrP); and
   a second layer comprising a combination of acid zirconium phosphate (AZP) and alkaline hydrous zirconium oxide (NaHZO); wherein
   the first layer is disposed nearer to the inlet than the second layer, and the second layer succeeds the first layer.
2. The cartridge of any preceding or following embodiment/feature/aspect, wherein:
   a) the first layer consists essentially of NaZrP; and
   b) the second layer consists essentially of a combination of AZP and NaHZO.
3. The cartridge of any preceding or following embodiment/feature/aspect, wherein:
   a) the first layer consists of NaZrP; and
   b) the second layer consists of a combination of AZP and NaHZO.
4. The cartridge of any preceding or following embodiment/feature/aspect, wherein the second layer immediately succeeds the first layer.
5. The cartridge of any preceding or following embodiment/feature/aspect, wherein the first layer and the second layer are separated by filter paper.
6. The cartridge of any preceding or following embodiment/feature/aspect, wherein the NaZrP, the AZP and the NaHZO are particles having an average grain size of from about 25 microns to about 60 microns.
7. The cartridge of any preceding or following embodiment/feature/aspect, wherein the NaZrP, the AZP and the NaHZO are particles having an average grain size of from about 25 microns to about 60 microns; wherein, the first layer comprises about 20 g of NaZrP; and wherein the second layer comprises about 50 g AZP and 80 g NaHZO.
8. The cartridge of any preceding or following embodiment/feature/aspect, wherein the combination of AZP and NaHZO has a pH of from about 3 to about 7.
9. The cartridge of any preceding or following embodiment/feature/aspect, wherein the combination of AZP and NaHZO has a pH of from about 3.5 to about 4.
10. The cartridge of any preceding or following embodiment/feature/aspect, wherein the combination of AZP and NaHZO has a pH of from about 5.5 to about 6.
11. The cartridge of any preceding or following embodiment/feature/aspect, wherein the AZP and NaHZO are each present in the combination in an amount to produce an NaHZO:AZP weight ratio of from about 0.2:0.8 to about 0.8:0.2.
12. The cartridge of any preceding or following embodiment/feature/aspect, wherein the NaHZO:AZP weight ratio is from about 0.5:0.5 to about 0.6:0.4.
13. The cartridge of any preceding or following embodiment/feature/aspect, wherein the NaHZO:AZP weight ratio is about 0.4:0.6.
14. The cartridge of any preceding or following embodiment/feature/aspect, wherein the NaHZO:AZP weight ratio is from about 0.22:0.78 to about 0.33:0.67.
15. The cartridge of any preceding or following embodiment/feature/aspect, wherein the NaZrP has a pH of from about 6.0 to about 7.4.
16. The cartridge of any preceding or following embodiment/feature/aspect, wherein the NaZrP has a pH of from about 6.5 to about 7.0.
17. The cartridge of any preceding or following embodiment/feature/aspect, further comprising granular activated carbon (GAC).
18. The cartridge of any preceding or following embodiment/feature/aspect, wherein the GAC is present as a layer in the cartridge.
19. The cartridge of any preceding or following embodiment/feature/aspect, wherein the layer of GAC is disposed closer to the inlet than the first layer, and precedes the first layer.
20. The cartridge of any preceding or following embodiment/feature/aspect, further comprising a separator pad, the separator pad being disposed between the layer of GAC and the first layer.

21. The cartridge of any preceding or following embodiment/feature/aspect, further comprising a carbon pad, the carbon pad being disposed immediately after the inlet, and preceding the first layer.
22. The cartridge of any preceding or following embodiment/feature/aspect, further comprising a filter pad, the filter pad being disposed immediately before the outlet, and succeeding the second layer.
23. The cartridge of any preceding or following embodiment/feature/aspect, further comprising a carbon pad, a separator pad, and/or a filter pad.
24. The cartridge of any preceding or following embodiment/feature/aspect, wherein the cartridge does not comprise a carbon pad.
25. A method to purify water comprising passing the water through the cartridge of any preceding or following embodiment/feature/aspect.
26. The method of any preceding or following embodiment/feature/aspect, wherein said water is municipal drinking water.
27. The method of any preceding or following embodiment/feature/aspect, wherein said water is waste water.
28. The method of any preceding or following embodiment/feature/aspect, wherein said water is natural water.
29. The method of any preceding or following embodiment/feature/aspect, wherein $Ca^{2+}$, $K^+$, $Mg^{2+}$, toxic trace metals, or any combination thereof present in the water are substantially removed by the first layer.
30. The method of any preceding or following embodiment/feature/aspect, wherein toxic anionic contaminants, $Na^+$, or any combination thereof present in the water are substantially removed by the second layer.
31. The method of any preceding or following embodiment/feature/aspect, wherein after passing said water through the cartridge of any preceding or following embodiment/feature/aspect, the water satisfies ANSI-AAMI water standard for dialysis treatment
32. A method for preparing purified fresh dialysate for dialysis comprising passing water through the cartridge of any preceding or following embodiment/feature/aspect, prior to conducting said dialysis.
33. The method of any preceding or following embodiment/feature/aspect, wherein said dialysis is performed using a portable dialysis system.

The present invention can include any combination of these various features or embodiments above and/or below as set forth in sentences and/or paragraphs. Any combination of disclosed features herein is considered part of the present invention and no limitation is intended with respect to combinable features.

The following examples are given to illustrate the nature of the present invention. It should be understood, however, that the present invention is not limited to the specific conditions or details set forth in these examples.

EXAMPLES

Example 1

About 500 gallons of contaminated feed water was treated using the cartridge of the present invention. The cartridge was about 5" in diameter and about 12" in height. The components of the cartridge were in the following order (as layers):
1. Particle filter pad
2. 1200 gm [$H^+$—ZP:HZO—$OH^-$] (55:45 wt ratio)
3. Filter paper
4. 500 gm [$Na^+$—ZP]
5. Carbon pad
6. 500 gm activated carbon (Calgon)
7. Carbon pad The specifications of the contaminated feed water are provided in Table 2 below. The specifications of the product (resulting) water quality are provided in Table 3 below. The water flow rate and pressure drop are provided in Table 4 below.

TABLE 2

Challenge test contaminated water quality

| TDS | 420 ppm | Silver | 100 ppm |
| pH | 6.9 | Mercury | 100 ppm |
| Sulfate | 120 ppm | Lead | 500 ppb |
| Nitrate | 20 ppm | Chromium | 500 ppb |
| Chloride | 60 ppm | Barium | 600 ppb |
| Fluoride | 2 ppm | Cadmium | 100 ppb |
| Arsenate | 1 ppm | Copper | 4 ppm |
| Calcium | 40 ppm | Iron (ferric) | 4 ppm |
| Magnesium | 20 ppm | Manganese | 700 ppb |
| Sodium | 50 ppm | Zinc | 600 ppb |

TABLE 3

Product water quality (500 gal life test with flow rate at 1 liter/min)

| | |
|---|---|
| pH of effluent | 6.0-6.7 |
| Hardness (calcium & magnesium) | 100% removal |
| Microbes & mold | Not detectable |
| Toxic heavy metals | 100% removal; below detection limit |
| Toxic anions | 100% removal; below detection limit (sulfate, nitrate, fluoride, arsenate, chromate, phosphate, etc.) |
| Chlorine & chloramine | 100% removal; below detection limit |
| Leachable from cartridge (chemicals, particles, etc.) | Not detectable (except for very minute amount of NaCl <100 ppm) |
| TDS (derived from small leakage of NaCl) | Initial 1 ppm NaCl<br>After 100 gal 30 ppm NaCl<br>After 200 gal 50 ppm NaCl<br>After 300 gal 65 ppm NaCl<br>After 400 gal 70 ppm NaCl |

TABLE 4

Pressure drop of 5" diameter model

| Flow Rate | Pressure drop psi |
|---|---|
| 0.5 L/min | 12 |
| 0.8 L/min | 18 |
| 1.5 L/min | 26 |

Example 2

About 100 gallons of impure water was treated at a challenge level of individual contaminant, using the same cartridge components as in Example 1. The water flow rate was 500 ml/min. The specifications of the resulting purified water are provided in Tables 5-7 below.

TABLE 5

Purity of product water-Cations

| Feed water | Product water |
|---|---|
| Heavy metals at challenge level 100 ppm | Below detection limit |
| Calcium at 40 ppm in feed | Below detection limit |
| Magnesium at 20 ppm in feed | Below detection limit |
| Aluminum at 1 ppm in feed | Below detection limit |
| Sodium at 50 ppm in feed | 0-50 gallon below 5 ppm (Below 10 micromhos) 500-100 gallon below 12 ppm (Below 70 micromhos) |

TABLE 6

Purity of product water-Anions

| Feed water | Product water |
|---|---|
| Nitrate at 100 ppm in feed | Below detection limit |
| Fluoride at 100 ppm in feed | Below detection limit |
| Sulfate at 200 ppm in feed | Below detection limit |
| Phosphate at 200 ppm in feed | Below detection limit |
| Arsenate at 10 ppm in feed | Below detection limit |
| Selenate at 10 ppm in feed | Below detection limit |
| Chloride at 60 ppm in feed | 0-50 gallons below 5 ppm 50-100 gallons below 20 ppm |
| pH | 0-50 gallons 5.5-7.0 |

TABLE 7

Purity of product water-Disinfectants

| Free chlorine at 2 ppm | Below detection limit |
|---|---|
| Chloramine at 2 ppm | Below detection limit |
| Organic at 1500 ppm low molecular wt (e.g. benzene, methylene, chloride) (HPLC test) | Below detection limit |

Example 3

The removal efficiency of toxic chemicals from water using a cartridge having, aside from a monolayer of mixed $H^+$—ZP:HZO—$OH^-$, no additional zirconium ion-exchange resins present. A carbon pad was below the layer and a particle filter pad was above. The cartridge was about 5" in diameter and contained about 2250 gm of $H^+$—ZP:HZO—$OH^-$ (blending ratio 1:1 by weight). The levels of adsorption of toxic chemicals from the contaminated water, with a flow rate of 500 ml/min, are provided in Table 8 below. The conductivity of the water during treatment is provided in Table 9 below.

TABLE 8

Removal of toxic chemicals

| Toxic chemicals | Level tested | Removal efficiency | Level in effluent | Amount of water treated before breakthrough (above ANSI-AAMI standard) | ANSI-AAMI standard |
|---|---|---|---|---|---|
| Al (soluble) | 500 ppb | 100% | 0 ppb | >150 gal | 10 ppb |
| F (NaF) | 100 ppm | 99.9% | 0.1 ppm | 90 gal | 0.2 ppm |
| $SO_4$ | 200 ppm | 100% | 0 | 90 gal | 100 ppm |
| Pb ($Pb(NO_3)_2$) | 10 ppm | 100% | 0 | >150 gal | 50 ppb |
| $NO_3$ ($NaNO_3$) | 200 ppm | 100% | 0 | 100 gal | 2 ppm (N) |
| $NO_3^-$ ($NaNO_3$) | 1000 ppm | 100% | Undetectable | >70 gal | 2 ppm (N) |
| Ca/Mg (hardness) | 100 ppm | 100% | 0 | >150 gal | 4 ppm (Ca) |
| Cu ($CuSO_4$) | 100 ppm | 100% | 0 | >150 gal | 0.1 ppm |
| As (arsenate) | 10 ppm | 100% | 0 | >150 gal | 5 ppb |
| Ba ($BaCl_2$) | 100 ppm | 100% | 0 | >150 gal | 0.01 ppm |
| Cd ($CdCl_2$) | 100 ppm | 100% | 0 | >150 gal | 0.001 ppm |
| Hg ($Hg(NO_3)_2$) | 10 ppm | 100% | 0 | >150 gal | 0.2 ppb |
| Ag ($AgNO_3$) | 10 ppm | 100% | 0 | >150 gal | 5 ppb |
| Cr ($CrCl_3$) | 100 ppm | 100% | 0 | >150 gal | 0.02 ppm |
| Ca 500 ppm | 500 ppm | ~100% | 0.1 ppm | >70 gal | 4 ppm (Ca) |

TABLE 6-continued

Purity of product water-Anions

| Feed water | Product water |
|---|---|
| | 50-100 gallons 5.0-5.5 |
| Microorganisms at $10^6$ CFU/ml | Below 100 CFU/ml |
| Endotoxin at $10^4$ EU/ml (LAL testing) | Complete removal |

TABLE 9

Conductivity monitoring during treatment of municipal water

| Amount of water treated | Conductivity monitored | Contaminants detection (other than chlorine) | Notes |
|---|---|---|---|
| After 10 gal | 0.5 micromhos | 0 | Small rise due to Release of very |
| 20 gal | 1 micromhos | 0 | Minute amount |
| 30 gal | 2 micromhos | 0 | of |

TABLE 9-continued

Conductivity monitoring during treatment of municipal water

| Amount of water treated | Conductivity monitored | Contaminants detection (other than chlorine) | Notes |
|---|---|---|---|
| 40 gal | 2.5 micromhos | 0 | NaCl previously absorbed |
| 50 gal | 4 micromhos | 0 | absorbed |
| 60 gal | 5 micromhos | 0 | |
| 70 gal | 7 micromhos | 0 | |
| 80 gal | 8 micromhos | 0 | |
| 90 gal | 15 micromhos | 8 ppm NaCl | |
| 100 gal | 30 micromhos | 18 ppm NaCl | |

(NOTE: Conductivity of OKC tap water 130 micromhos)

Example 4

In this experiment, a cartridge (1"×6¾") was used having 60 g of a monolayer mixed-bed layer of $H^+$—ZP:HZO—$OH^-$, no additional zirconium ion-exchange resins present. A carbon pad was below this monolayer and a particle filter pad was above. The flow rate was 20 ml/min. The cartridge was tested for removal of toxic metals from about 70 gallons of contaminated municipal tap water. The column specifications for the cartridge are provided in Table 10 below. The cartridge contained about 60 gm of $H^+$—ZrP/HZO—$OH^-$ (1:1 wt ratio). The water had a temperature of 25° C. and contained the additive contaminants shown in Table 11 below. The levels of adsorption by this cartridge are provided in Table 12 below.

TABLE 10

Column Specifications

| 1" ID | $H^+$—ZP:HZO—$OH^-$ (1:1) |
|---|---|
| Column height | 6¾ inches |
| Flow rate | 20 ml/min (1" ID) or |
| | 500 ml/min (5" ID) |

TABLE 11

Additive contaminants in test bath of 20 liter municipal tap water at 25° C.:

| (i) Cd | ($CdCl_2$) | 10 ppm |
| (ii) Hg | ($Hg(NO_3)_2$) | 1 ppm |
| (iii) Se | (AA Stock) | 10 ppm |
| (iv) Fe | ($FeSO_4$) | 10 ppm |

TABLE 12

Results-Adsorption test results scaled up to 1500 gm of zirconium sorbents for treatment of about 70 gal water

| Toxic chemicals | Level tested in bath | Removal efficiency | Level in effluent | Amount of water treated before breakthrough (above ANSI-AAMI) | ANSI-AAMI standard |
|---|---|---|---|---|---|
| Cd | 7.5 ppm | 100% | <DL (0.01 ppm) | >70 gal | 0.001 ppm |
| Hg | 0.33 ppm | 100% | <DL (0.0005 ppm) | >70 gal | 0.2 ppb |
| Se | 18 ppm | 100% | <DL (0.005 ppm) | >70 gal | 9 ppb |
| Fe | 10 ppm | 100% | <DL (0.5 ppb) | >70 gal | — |

Example 5

Municipal water from Oklahoma City with added contaminants, was treated using a cartridge (5"×7") having the following components (as layers) in order:
1. Particle filter pad
2. 1200 gm [$H^+$—ZP:HZO—$OH^-$] (1:1 wt ratio)
3. Carbon pad
4. 500 gm activated carbon (Calgon)
5. Carbon pad The column specifications are provided in Table 13 below.

TABLE 13

Column Specifications

| 5" ID model | |
|---|---|
| $H^+$—ZP:HZO—$OH^-$ (1:1) | 1200 gm |
| Calgon activated carbon | 500 gm |
| Carbon pads | 2 |
| Particle filter pad | 1 |

The purity level of effluent or level of contaminants present in the effluent from the cartridge is provided in the tables shown in FIGS. 4 and 5.

Example 6

The same design of cartridge as in Example 5 was used with a flow rate of 1 L/min. The column specifications for the zirconium cartridge are provided in Table 16 below. The levels of contaminants per 10 gallons of feed water are provided in Table 17. The conductance change in the effluent water is provided in Table 18. The purity level of the effluent or level of contaminants present in the effluent is provided in the tables of FIGS. 6 and 7.

TABLE 16

Column Specifications

| 5" ID model | |
|---|---|
| $H^+$—ZP:HZO—$OH^-$ (1:1) | 1200 gm |
| Calgon activated carbon | 500 gm |
| Carbon pads | 2 |
| Particle filter pad | 1 |

TABLE 17

Feed water with added contaminants every 10 gallons

| | |
|---|---|
| NaF | 0.2 gm |
| BaCl$_2$ | 0.1 gm |
| CaCl$_2$ | 0.2 gm |
| KCl | 0.2 gm |
| Pb(NO$_3$)$_2$ | 0.1 gm |
| Na arsenate | 0.1 gm |
| Amount of water to be treated | 70 gal |
| Flow rate of water | 1 L/min |
| Conductance of water | 178 μmhos |

TABLE 18

Conductance change of effluent water

| | |
|---|---|
| Feed water | 180 μmhos |
| Initial effluent | 2 μmhos |
| 5 gal | 0.7 μmhos |
| 10 gal | 0.5 μmhos |
| 20 gal | 1 μmhos |
| 30 gal | 2 μmhos |
| 40 gal | 5 μmhos |
| 50 gal | 8 μmhos |
| 60 gal | 15 μmhos |
| 70 gal | 30 μmhos |

Example 7

A cartridge (1"×11.2") using a 100 g monolayer of H+—ZP:HZO—OH— was used as in Example 3 to test the removal efficiency of inorganic contaminants in municipal tap water from Oklahoma City, at a low temperature of about 5° C. The column specifications for the cartridge are provided in Table 19 below. The additive contaminants per 20 ml of the water/min are provided in Table 20 below. A description of the purity of the effluent or level of contaminants present in the effluent is provided in the table of FIG. 8.

TABLE 19

Column specifications

1'" ID model

| | |
|---|---|
| H$^+$—ZP:HZO—OH$^-$ (1:1) | 100 gm |
| Flow rate | 20 ml/min |

TABLE 20

Additive contaminants for test bath of 20 liter of tap water

| | | | |
|---|---|---|---|
| Al | Soluble | 500 | ppb |
| F$^-$ | (NaF) | 100 | ppm |
| SO$_4$$^{2-}$ | (NaSO$_4$) | 200 | ppm |
| Pb | (Pb(NO$_3$)$_2$) | 10 | ppm |
| NO$_3$- | (NaNO$_3$) | 200 | ppm |
| Ca/Mg | (CaCl$_2$ + MgCl$_2$) | 100 | ppm |
| Cu | CuSO$_4$ | 100 | ppm |
| As | A arsenate | 10 | ppm |
| Ba | BaCl$_2$ | 100 | ppm |
| Cd | CdCl$_2$ | 100 | ppm |
| Hg | (Hg(NO$_3$)$_2$) | 10 | ppm |
| Ag | (AgNO$_3$) | 10 | ppm |
| Cr | (CrCl$_3$) | 100 | ppm |

Example 8

The cartridge of the present invention was tested for removal of hardness metals. The components of the cartridge were present in the following order (as layers):

1. Particle filter pad
2. 1200 gm [H$^+$—ZP:HZO—OH$^-$] (55:45 wt ratio)
3. Filter paper
4. 500 gm [Na$^{30}$—ZP]
5. Carbon pad The column specifications and test conditions are provided in Table 21 below. The results of the test are provided in Table 22 below.

TABLE 21

Column Specifications and Test Conditions

| | |
|---|---|
| H$^+$—ZP:HZO—OH$^-$ (55:45) | 1200 gm |
| Na$^+$—ZP (preceding layer) | 500 gm |
| Pressure | 30 psi |
| Flow rate | 850 ml/min |

TABLE 22

Removal of hardness metals

| Time (min) | Volume processed | pH (strip) | Ca$^{2+}$ (ppm) | Mg$^{2+}$ (ppm) | Na$^+$ (ppm) |
|---|---|---|---|---|---|
| Start | Bath | 6.9 | 48 | 20.6 | 40 |
| 30 min | 6.8 gallon | 6.8 | 0 | 0 | 0.4 |
| 60 min | 13.6 gallon | 6.6 | 0 | 0 | 0.29 |
| 120 min | 26.95 gallon | 6.7 | 0.05 | 0.02 | 0.6 |
| 180 min | 40.4 gallon | 5.8 | 0.02 | 0.03 | 51 |
| 240 min | 54 gallon | 5.6 | 0.03 | 0.07 | 69 |
| 300 min | 67.4 gallon | 5.5 | 0.04 | 0.04 | 33 |
| 360 min | 80.8 gallon | 5.0 | 0.05 | 0.06 | 33 |
| 420 min | 94 gallon | 5.0 | 0.03 | 0.10 | 69 |
| 480 min | 100 gallon | 5.0 | 0.06 | 0.4 | 69 |

Example 9

The cartridge of the present invention was tested for removal of hardness metals (Ca$^{2+}$), common toxic anions (F$^-$ and sulfate), and disinfectants, at challenge levels. The components of the cartridge were present in the following order (as layers):

1. Particle filter pad
2. 130 gm [H$^+$—ZP:HZO—OH$^-$] (50:80 wt ratio)
3. Filter paper
4. 20 gm [Na$^+$—ZP]
5. Separator pad
6. 50 gm activated carbon (Calgon)
7. Carbon pad The cartridge was configured as shown in FIG. 2. The amount of NaZrP in the first layer (6) was about 20 gm by weight. The amount of AZP and NaHZO in the mixed-bed layer (8) was about 50 gm:80 gm by weight. The amount of activated carbon in the layer of granular activated carbon (12) was about 50 gm. The inlet (2) of the zirconium cartridge was about 2" in diameter. The results of the test are provided in Table 23 below.

TABLE 23

|  | pH | Chlorine (ppm) | Ca$^{2+}$ (ppm) | F$^-$ (ppm) | SO$_4$ (ppm) | Na$^+$ (ppm) | |
| --- | --- | --- | --- | --- | --- | --- | --- |
| Bath | 7.89 | 8.5 | 120 | 2.41 | 120 < 140 | 44.677 | (ANSI-AAMI for Na$^+$ |
| 1 | 6.12 | 0 | 10 | 0.02 | <50 | 26.0 | is 70 ppm) |
| 2 | 5.52 | 0 | 0 | 0.01 | <50 | 16.6 | Chlorine is |
| 3 | 5.25 | 0 | 0 | 0.01 | <50 | 18.5 | completely removed. |
| 4 | 5.16 | 0 | 0 | 0.01 | <50 | 28.5 | pH of product water |
| 5 | 5.30 | 0 | 0 | 0.01 | <50 | 39.4 | in composite is 5.82 |
| 6 | 5.53 | 0 | 0 | 0.01 | <50 | 44.4 | TDS is below 100 |
| 7 | 5.55 | 0 | 0 | 0.01 | <50 | 47.6 | ppm in effluent |
| 8 | 5.52 | 0 | 0 | 0.01 | <50 | 49.5 | composite |
| 9 | 5.55 | 0 | 0 | 0.01 | <50 | 50.7 | |
| Composite | 5.82 | 0 | 0 | 0.01 | <50 | 35.9 | |

For this test, samples were taken at every liter effluent. The composite sample in the table reflects a mixture of all the effluent samples (1-9). Chlorine analysis performed by Hack total chlorine test kit. The Ca$^{2+}$ analysis was performed using LaMotte total hardness test kit (as CaCO$_3$). As can be seen in Table 23, Ca$^{2+}$, F$^-$ and SO$_4^{2-}$ was completely removed in the effluent for every liter sample, and was below the detection limit in the composite. Also, Na$^+$ was lowered from 45 ppm in the untreated bath to 35 ppm in the effluent composite.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A cartridge comprising:
a first end having an inlet;
a second end opposing the first end, the second end having an outlet;
a first layer comprising sodium zirconium phosphate (NaZrP); and
a second layer comprising a combination of acid zirconium phosphate (AZP) and alkaline hydrous zirconium oxide (NaHZO); wherein
the first layer is disposed nearer to the inlet than the second layer, and the second layer succeeds the first layer.

2. The cartridge of claim 1, wherein:
a) the first layer consists essentially of NaZrP; and
b) the second layer consists essentially of a combination of AZP and NaHZO.

3. The cartridge of claim 1, wherein:
a) the first layer consists of NaZrP; and
b) the second layer consists of a combination of AZP and NaHZO.

4. The cartridge of claim 1, wherein the second layer immediately succeeds the first layer.

5. The cartridge of claim 1, wherein the first layer and the second layer are separated by filter paper.

6. The cartridge of claim 1, wherein the NaZrP, the AZP and the NaHZO are particles having an average grain size of from about 25 microns to about 60 microns.

7. The cartridge of claim 1, wherein the NaZrP, the AZP and the NaHZO are particles having an average grain size of from about 25 microns to about 60 microns; wherein, the first layer comprises about 20 g of NaZrP; and wherein the second layer comprises about 50 g AZP and 80 g NaHZO.

8. The cartridge of claim 1, wherein the combination of AZP and NaHZO has a pH of from about 3 to about 7.

9. The cartridge of claim 1, wherein the combination of AZP and NaHZO has a pH of from about 3.5 to about 4.

10. The cartridge of claim 1, wherein the combination of AZP and NaHZO has a pH of from about 5.5 to about 6.

11. The cartridge of claim 1, wherein the AZP and NaHZO are each present in the combination in an amount to produce an NaHZO:AZP weight ratio of from about 0.2:0.8 to about 0.8:0.2.

12. The cartridge of claim 1, wherein the NaHZO:AZP weight ratio is from about 0.5:0.5 to about 0.6:0.4.

13. The cartridge of claim 1, wherein the NaHZO:AZP weight ratio is about 0.4:0.6.

14. The cartridge of claim 1, wherein the NaHZO:AZP weight ratio is from about 0.22:0.78 to about 0.33:0.67.

15. The cartridge of claim 1, wherein the NaZrP has a pH of from about 6.0 to about 7.4.

16. The cartridge of claim 1, wherein the NaZrP has a pH of from about 6.5 to about 7.0.

17. The cartridge of claim 1, further comprising granular activated carbon (GAC).

18. The cartridge of claim 17, wherein the GAC is present as a layer in the cartridge.

19. The cartridge of claim 18, wherein the layer of GAC is disposed closer to the inlet than the first layer, and precedes the first layer.

20. The cartridge of claim 18, further comprising a separator pad, the separator pad being disposed between the layer of GAC and the first layer.

21. The cartridge of claim 1, further comprising a carbon pad, the carbon pad being disposed immediately after the inlet, and preceding the first layer.

22. The cartridge of claim 1, further comprising a filter pad, the filter pad being disposed immediately before the outlet, and succeeding the second layer.

23. The cartridge of claim 1, further comprising a carbon pad, a separator pad, and/or a filter pad.

24. The cartridge of claim 1, wherein the cartridge does not comprise a carbon pad.

25. A method to purify water comprising passing the water through the cartridge of claim 1.

26. The method of claim 25, wherein said water is municipal drinking water.

27. The method of claim 25, wherein said water is waste water.

28. The method of claim 25, wherein said water is natural water.

29. The method of claim 25, wherein $Ca^{2+}$, $K^+$, $Mg^{2+}$, toxic trace metals, or any combination thereof present in the water are substantially removed by the first layer.

30. The method of claim 25, wherein toxic anionic contaminants, $Na^+$, or any combination thereof present in the water are substantially removed by the second layer.

31. The method of claim 25, wherein after passing said water through the cartridge of claim 1, the water satisfies ANSI-AAMI water standard for dialysis treatment.

32. A method for preparing purified fresh dialysate for dialysis comprising passing water through the cartridge of claim 1, prior to conducting said dialysis.

33. The method of claim 32, wherein said dialysis is performed using a portable dialysis system.

34. The cartridge of claim 1, wherein said first layer and said second layer are the only layers containing zirconium or zirconium containing components.

35. The cartridge of claim 2, wherein said cartridge consists essentially of said first layer, said second layer, and optionally filter pad or paper, granular activated carbon, separator pad or carbon pad, or any combination thereof.

36. The cartridge of claim 3, wherein said cartridge consists of said first layer, said second layer, and optionally filter pad or paper, granular activated carbon, separator pad or carbon pad, or any combination thereof.

* * * * *